(12) United States Patent  
Hu (10) Patent No.: US 8,682,136 B2  
(45) Date of Patent: Mar. 25, 2014

(54) REPRESENTING VIDEO CONTENT (75) Inventor: Xiao Kang Hu, Ottawa (CA)

(73) Assignee: BlackBerry Limited, Waterloo (CA)

( * ) Notice: Subject to any disclaimer, the term of this patent is extended or adjusted under 35 U.S.C. 154(b) by 486 days.

(21) Appl. No.: 12/971,972

(22) Filed: Dec. 17, 2010

(65) Prior Publication Data

US 2012/0033940 A1 Feb. 9, 2012

Related U.S. Application Data

(60) Provisional application No. 61/370,406, filed on Aug. 3, 2010.

(51) Int. Cl.
*H04N 9/80* (2006.01)

(52) U.S. Cl.
USPC .......................... 386/241; 386/248

(58) Field of Classification Search
None
See application file for complete search history.

(56) References Cited

U.S. PATENT DOCUMENTS

| | | | |
|---|---|---|---|
| 5,627,765 | A | 5/1997 | Robotham |
| 6,411,771 | B1 | 6/2002 | Aotake |
| 6,496,228 | B1 | 12/2002 | McGee |
| 6,571,054 | B1 | 5/2003 | Tonomura |
| 7,751,683 | B1 | 7/2010 | Belknap |
| 2005/0063677 | A1 | 3/2005 | Kosako et al. |
| 2005/0201628 | A1* | 9/2005 | Tojo ........................ 382/239 |
| 2005/0234719 | A1 | 10/2005 | Hosoda et al. |
| 2008/0192840 | A1 | 8/2008 | Hua et al. |

FOREIGN PATENT DOCUMENTS

EP 1465196 A1 10/2004

OTHER PUBLICATIONS

Extended European Search report mailed Mar. 23, 2011. In corresponding application No. 10195728.0.
Examination Report mailed Sep. 24, 2012, in corresponding European patent application No. 10195728.0.
Anonymous: "Algorithm for counting the number of unique colors in an image Internet Article", Aug. 27, 2008, XP55038048, retrieved from the internet: URL:http://stackoverflow.com/questions/126680/algorithm-for-counting-the-number-of-unique-colors-in-an-image. [retrieved on Sep. 12, 2012].
Summons to attend oral proceedings pursuant to Rule 115 (1) EPC mailed Apr. 11, 2013, in corresponding European patent application No. 10195728.0.

* cited by examiner

*Primary Examiner* — William C Vaughn, Jr.
*Assistant Examiner* — Heather Jones
(74) *Attorney, Agent, or Firm* — Novak Druce Connolly Bove + Quigg LLP (57) ABSTRACT

Representing a video by a frame of the video. Processing a frame by receiving a first frame of a video; dividing the received first frame into at least one region; and for each region, obtaining a pixel value from a each of a plurality of pixels of the region; and determining variability among the obtained pixel values. For a determined variability less than a predetermined threshold, processing at least one subsequent frame.

12 Claims, 9 Drawing Sheets

REPRESENTING VIDEO CONTENT

CROSS REFERENCE TO RELATED APPLICATIONS

This application claims the benefit of U.S. Provisional Application No. 61/370,406, filed Aug. 3, 2010 of the same title, which application is hereby incorporated herein by reference.

FIELD

The specification relates generally to representing multimedia files in electronic devices, and specifically to technology for evaluating individual video frames for likelihood that the frame contains content from which a user could identify the video.

BACKGROUND

When viewing a list of one or more videos it would be helpful to be able to identify each video by seeing a thumbnail of a representative frame grab of the video. One or more representative frames grab(s) could be associated with a video, but such is not always the case. Even where one or more frame grab(s) are associated with a video, it is not always the case that the associated frame grabs contain content that will allow a user to identify the video from the frame grab. For example, the frame grab(s) may be from a moment when the video is uneventful (a black screen, blank text, credits, etc).

BRIEF DESCRIPTIONS OF THE DRAWINGS

Implementations of the technology are described with reference to the following figures, in which.

DETAILED DESCRIPTION

Reference will now be made in detail to implementations of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one implementation can be used on another implementation to yield a still further implementation. Thus, it is intended that the present technology cover such modifications and variations that come within the scope of the technology.

Figure 1:
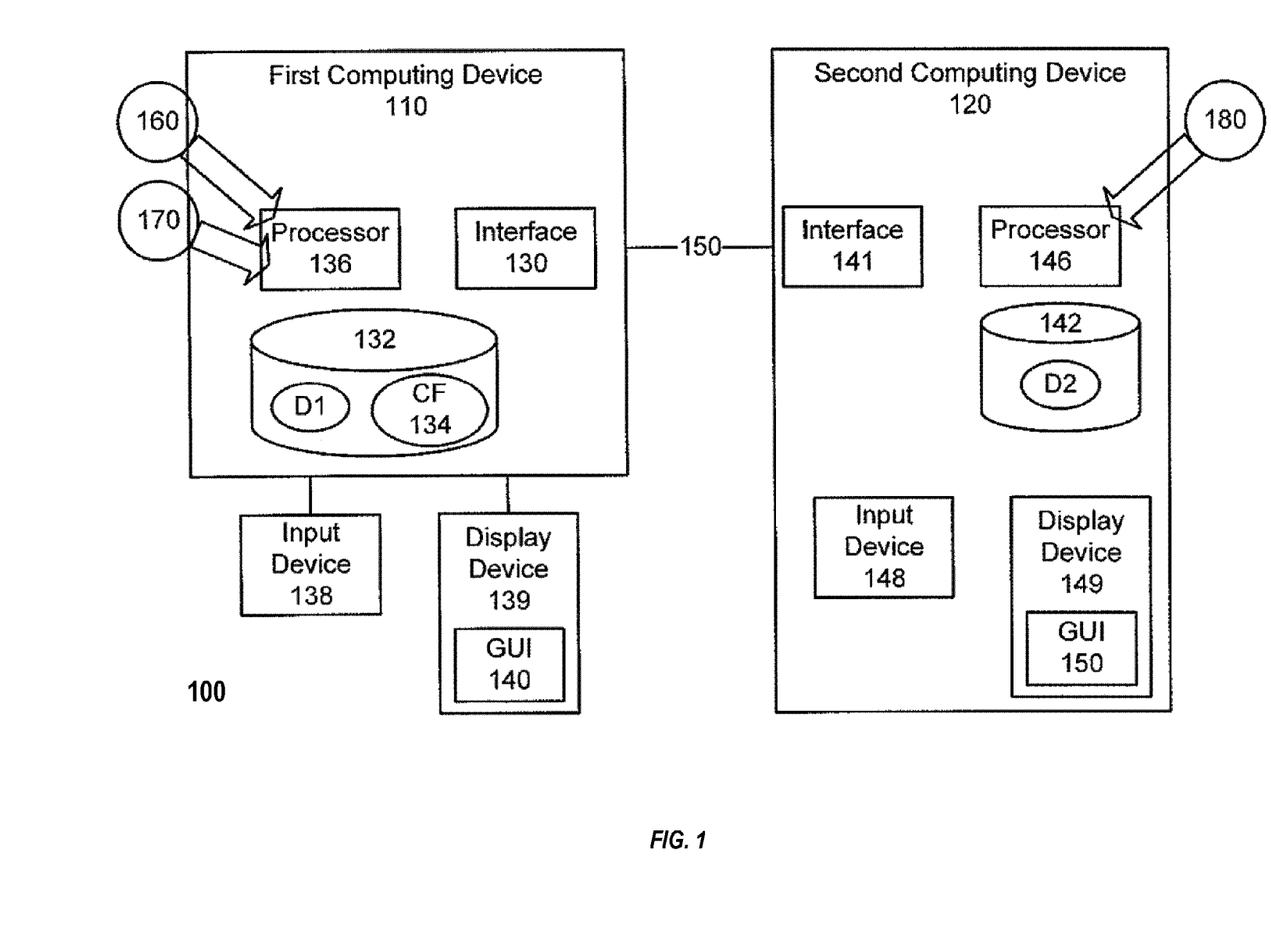
FIG. 1 illustrates systems for updating synchronization configuration files, according to non-limiting implementations.

FIG. 1 depicts a system 100 for synchronizing files at a first computing device 110, according to non-limiting implementations, synchronization occurring when a second computing device 120 is in communication with the first computing device 110. The computing devices 110, 120 synchronize via a link 150. The link 150 can be wireless or wireless as desired; the link 150 can further comprise any suitable communication network. Synchronization can occur between the computing devices 110, 120 periodically, when communications are initialized, when triggered by a user of the either first or second computing devices 110, 120, and by combinations thereof. In general, during synchronization, specific data present at each of the computing devices 110, 120 can be resolved such that similar versions of the data are present on each computing devices 110, 120. Such synchronization can comprise at least one of: downloading data to the second computing device 120 from the first computing device 110; uploading data to the first computing device 110 from the second computing device 120; and deleting data from at least one of the first and second computing devices 110, 120.

Though the first computing device 110 can typically comprise any suitable computing device, including but not limited a desktop computer, a laptop computer, a server, a multimedia player, and the like, the first computing device 110 can be a mobile communication device such as a smartphone. The second computing device 120 can be a handheld electronic communication device such as a smartphone.

The first computing device 110 can comprise an interface 130 enabled to communicate with the second computing device 120, the interface 130 being generally compatible with the link 150. For example, if the link 150 comprises a wireless link, the interface 130 is enabled to communicate wirelessly, using any suitable protocol; if the link 150 comprises a wired link, then the interface 130 is enabled to communicate via a wired link, using any suitable wired protocol.

The first computing device 110 further can comprise a memory 132 for storing at least one configuration file 134 associated with the second computing device 120, the at least one configuration file 134 comprising data for synchronizing the second computing device 120 with the first computing device 110. The memory 132 can further comprise data D1 that is to be synchronized with data D2 stored at the second computing device 120. In some implementations, the data D1 and D2 can comprise any suitable media file, including but not limited to music data, video data, playlists, and/or library(s) of media files.

In some implementations, a plurality of configuration files are associated with the second computing device 120, the plurality of configuration files including the at least one configuration file 134, and stored in the memory 132.

The memory 132 can comprise any suitable memory device, including but not limited to random access memory (RAM), removable memory, memory cards, hard disks, and the like. In some implementations, the memory 132 can comprise a database, with the at least one configuration file 134 stored therein.

The first computing device 110 can further comprise a processor 136 in communication with the interface 130 and the memory 132, for example via a suitable computer bus (not depicted). The processor 136 can be enabled to effect synchronization between the two computing devices 110, 120, including but not limiting to downloading at least a subset of data D1 to the second computing device 120, receiving at least a subset of data D2 from the second computing device 120 and storing the at least a subset of data D2 in storage, and deleting at least a subset of data D1. The processor 136 also can be enabled to: retrieve the at least one configuration file 134 associated with the second computing device 120, the second computing device 120 having been previously synchronized with the first computing device 110, the retrieving occurring in the absence of communication between the second computing device 120 and the first computing device 110; update the at least one configuration file 134, in accordance with data indicative of changes to the at least one configuration file 134, such that the at least one configuration file 134 is in an updated state, such that when the second computing device 120 is next in communication with the first computing device 110, the at least one configuration file 134 in an updated state is used to synchronize the second computing device 120 with the first computing device 110.

The first computing device 110 also can be in communication with any suitable input device 138, or combination of input devices, including but not limited to a keyboard, a pointing device, a mouse, a trackball, a touch screen, a touchpad, and the like. The first computing device 110 generally can be enabled to receive input data from the input device 138 for processing by the processor 136.

The first computing device 110 also can be in communication with any suitable display device 139, the processor 136 further enabled to control the display device 139 to display information, for example regarding synchronization, including but not limited to at least one graphical user interface (GUI) 140. The display device 139 can include, but is not limited to, a flat panel display (e.g. a liquid crystal display (LCD), plasma, and the like), a cathode ray tube (CRT), a computer monitor, and the like. The input device 138 and the display device 139 can be used by a user to interact with the first computing device 110. In some implementations, the first computing device 110 can comprise the input device 138 and the display device 139.

The first computing device 110 further can comprise a synchronization application 160. The synchronization application 160 causes the processor 136 to perform several functions when the processor 136 processes the synchronization application 160. For example, the synchronization can cause the processor 136 to synchronize the computing devices 110, 120 when the computing devices 110, 120 are in communication. In particular, the synchronization application 160 can cause data D1 and D2 to synchronize in accordance with the at least one configuration file 134 associated with the second computing device 120. For example, the at least one configuration file 134 can comprise data indicative of a subset of data D1 that is to be synchronized with data D2.

However, in the absence of communications between the computing devices 110, 120 (e.g., the second computing device 120 is either absent from the system 100 and/or the link 150 has not been established and/or the link 150 has been severed), then the synchronization application 160 can cause the processor 136 to update the at least one configuration file 134, such that at least one updated configuration file can be used to synchronize the second computing device 120 with the first computing device 110 during the next synchronization session. The synchronization application 160 can be stored in the memory 132 and processed by the processor 136, which then can control the display device to display the at least one GUI 140, such that a user can interact with the synchronization application 160 via the input device 138.

The first computing device 110 can further comprise a data management application 170 for managing data D1. In some implementations, the data management application 170 can comprise a multimedia file management application for managing and/or playing multimedia files and/or downloading multimedia files from a communication network (not depicted), for example via the Internet. In these implementations, the data D1 comprises media data as described above. Furthermore, in implementations where the data management application 170 is for downloading multimedia files from a communication network, the interface 130 can be enabled to communicate via the communication network. The data management application 170 can be stored at the memory 132 and processed by the processor 136, for example, when input data indicative of a desire to use the data management application 170 is received via the input device 138.

The second computing device 120 can comprise a portable computing device, including but not limited to a PDA (personal digital assistant), a cell phone, a smartphone, a laptop computer, and the like, and/or a combination. In general, the second computing device 120 can comprise any electronic device that can be synchronized with the first computing device 110.

The second computing device 120 can comprise an interface 141, similar to interface 130, and generally compatible with link 150. The second computing device 120 further can comprise a memory 142 for storing the data D2. The memory 142 can be similar to the memory 132, as described above. The second computing device 120 further can comprise a processor 146 for effecting synchronization between the first and second computing devices 110, 120, including but not limiting to uploading at least a subset of data D2 to the first computing device 110, receiving at least a subset of data D1 from the first computing device 110 and storing the at least a subset of data D1 in storage, and deleting at least a subset of data D2.

The second computing device 120 further can comprise an input device 148, similar to the input device 138 and a display device 149 similar to the display device 139. The display device 149 can be enabled to present a GUI 150 such that user can interact with the second computing device 120 via the input device 148 and the display device 149.

In some implementations, the second computing device 120 further can comprise a synchronization application 180 for managing synchronization at the second computing device 120. The synchronization application 180 can be stored at in the memory 142 and processed by the processor 146 when synchronization is initiated, for example once the link 150 is established. In some implementations, the synchronization application 180 also can cause synchronization to initiate when processed by the processor 146.

Figure 2:
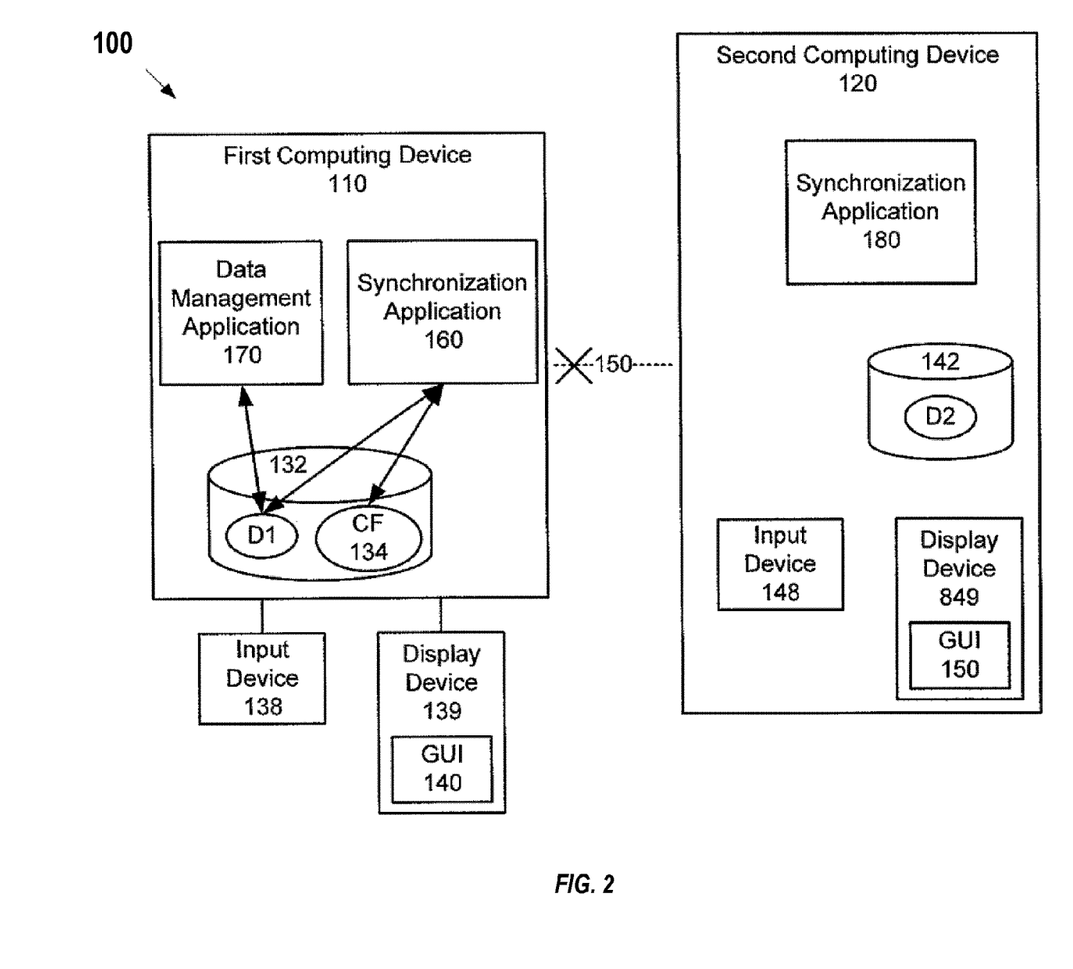
FIG. 2 illustrates a block diagram of applications being processed by the system of FIG. 1, according to non-limiting implementations.

Attention is now directed to FIG. 2 that depicts a block diagram of applications 160, 170 being processed by the first computing device 110, according to non-limiting implementations, in the absence of communications between the computing devices 110, 120, as represented by a severing of the link 150. While not all elements of each of the computing devices 110, 120 are depicted in FIG. 2, it is understood that the applications 160 and 170 are being processed by the processor 136.

It is generally understood that the data management application 170 manages data D1 by adding to the data D1, deleting a subset of the data D1, or updating the data D1, for example in accordance with input received via the input device 138. In the following discussion, synchronization will be described with reference to the data D1 comprising multimedia data files that are managed via the data management application 170 and stored in the memory 132. It is further understood that the data D2 comprises multimedia data files that are to be synchronized with at least a subset of the data D1. In particular it assumed that the data D1 comprise songs/media files (including videos), and playlists each of which comprises a list of songs/media files that are to be played when a playlist is processed. For example, in these implementations, a subset of the data D1 can comprise the playlist presented in TABLE 1, according to non-limiting implementations.

TABLE 1 a subset of Data D1 comprising a playlist.
Playlist Title: Party Shuffle

Song 1
Song 2
Song 3
Song 4

While the subset of data D1 in TABLE 1 is presented in the format of rows and columns, it is understood that any suitable format can be used. In implementations of the subset of data D1 presented in TABLE 1, the subset of data D1 comprises a title of the play list ("Party Shuffle"), and a list of the names of songs/media files Song 1, Song 2, etc., stored in an order that they are to be played when the playlist is processed, for example via the data management application 170. Furthermore, it is understood that the data D1 further can comprise the songs/media files Song 1, Song 2, etc. and that the multimedia files Song 1, Song 2, etc. are retrievable from the memory 132 and can be playable by the data management application 170.

It is further understood that the data D1 can be updated: for example, songs in the "Party Shuffle" playlist can be added and/or deleted and/or the order of their play can be changed, via interactions with the input device 138 and the data management application 170, etc. It is yet further understood that the data D1 can comprise more than one playlist.

It is further understood that the synchronization application 170 can update the at least one configuration file 134 by adding to the at least one configuration file and/or deleting at least a subset of the at least one configuration file 134, for example in accordance with input received via the input device 138. Furthermore, it is understood that such updating can occur in the absence of communication between the computing devices 110, 120.

The at least one configuration file 134 comprises data for synchronizing the second computing device 120 with the first computing device 110. In particular, the at least one configuration file 134 can comprise identifiers of subsets of the data D1 that are to be synchronized with the data D2 stored at the second computing device 120. For example, the at least one configuration file 134 can comprise a list of files stored in data D1 that are to be synchronized with data D2.

Continuing with the example of the data D1 and the data D2 comprising playlists, songs/media files, etc., TABLE 2 presents a non-limiting exemplary implementation of the at least one configuration file 134.

TABLE 2

An implementation of the at least one configuration
file 134 comprising playlists.
"Second Computing Device ID"

Party Shuffle
Genius
90's Music

While the at least one configuration file 134 in TABLE 2 is presented in the format of rows and columns, it is understood that any suitable format can be used. In implementations of the at least one configuration file 134 presented in TABLE 2, the at least one configuration file 134 can comprise any suitable identifier of the second computing device 120 ("Second Computing Device ID"), for example a MAC Address, a name of the second computing device 120, a phone number associated with the second computing device 120, a personal identification number (PIN) associated with the second computing device 120, and the like. The at least one configuration file 120 further comprises a list of playlists ("Party Shuffle", "Genius", and "90's Music") stored in the data D1 that can be stored and/or synchronized in the data D2. It is further understood that the synchronization application 160 can process each of the playlists and determine which songs on each of the playlists are to be downloaded to the second computing device 120.

When viewing a list of one or more videos, e.g., viewing lists of videos in D1 using data management application 170 or synchronization application 160, it would be helpful to be able to identify each video by seeing a thumbnail of a representative frame grab of the video. One or more representative frames grab(s) could be associated with a video, but such is not always the case. Even where one or more frame grab(s) are associated with a video, it is not always the case that the associated frame grabs contain content that will allow a user to identify the video from the frame grab. For example, the frame grab(s) may be from a moment when the video is uneventful (a black screen, blank text, credits, etc).

In various implementations, the present technology increases the likelihood that a thumbnail of a frame grab from a video is sufficiently representative of that video to allow a viewer to identify some aspect of the video. While the technology can find use in any situation where it is desirable for a viewer to be able to identify a video from a frame grab (or from a thumbnail image thereof), e.g., on a mobile device, in a video juke box, in an advertisement, enabling implementations of the technology are disclosed herein in the context of data management applications 170 and a synchronization applications 160.

Figure 3:
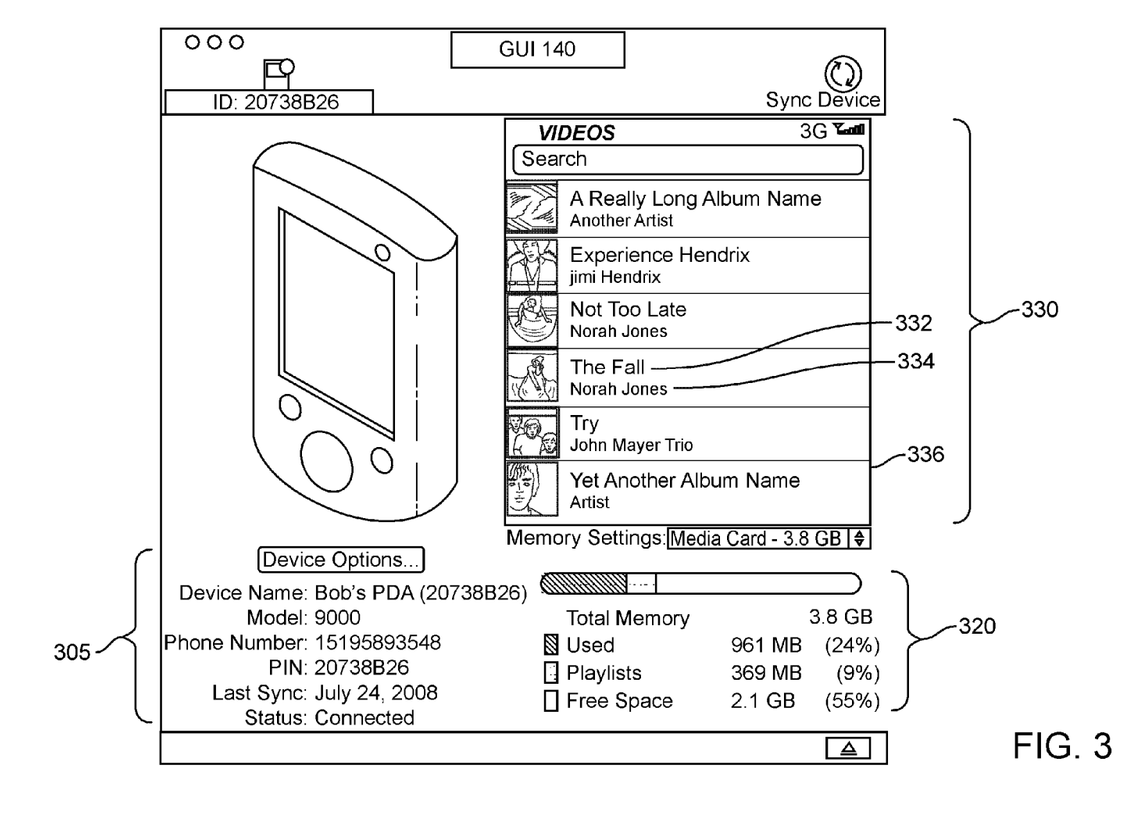
FIG. 3 illustrates a GUI for updating synchronization configuration files, according to non-limiting implementations.

Referring to FIG. 3, a GUI 140 is shown when display device 139 is being controlled to display data associated with the synchronization application 160, 170. Identifiers associated with the second computing device 120 are displayed ("ID", "Model", "Phone Number", "PIN") are displayed in the fields 305. In some implementations, an identifier can be entered into one of the fields 305 to identify the second computing device 120 in the absence of communication between the computing devices 110, 120.

The GUI 140 presented in FIG. 3 further comprises memory data 320, which provides a breakdown of the configuration of the memory 142. In general the memory data 320 can be retrieved from the second computing device 120 when communications between the computing devices 110, 120 are initiated and/or when either the data management application 170 synchronization application 160 is initiated. Furthermore, in some implementations, the memory data 320 can be stored in the at least one configuration file 134, and retrieved for display in the GUI in the absence of communications between the computing devices 110, 120.

To facilitate transfer of videos from the first computing device 110 to the second computing device 120 GUI 140 can present list of 330 comprising video titles 332 (e.g., "The Fall"), artist names 334 (e.g., "Nora Jones"), and a thumbnail 336 of a frame grab for each video, e.g., each video to be transferred to the second computing device 120.

Figure 4:
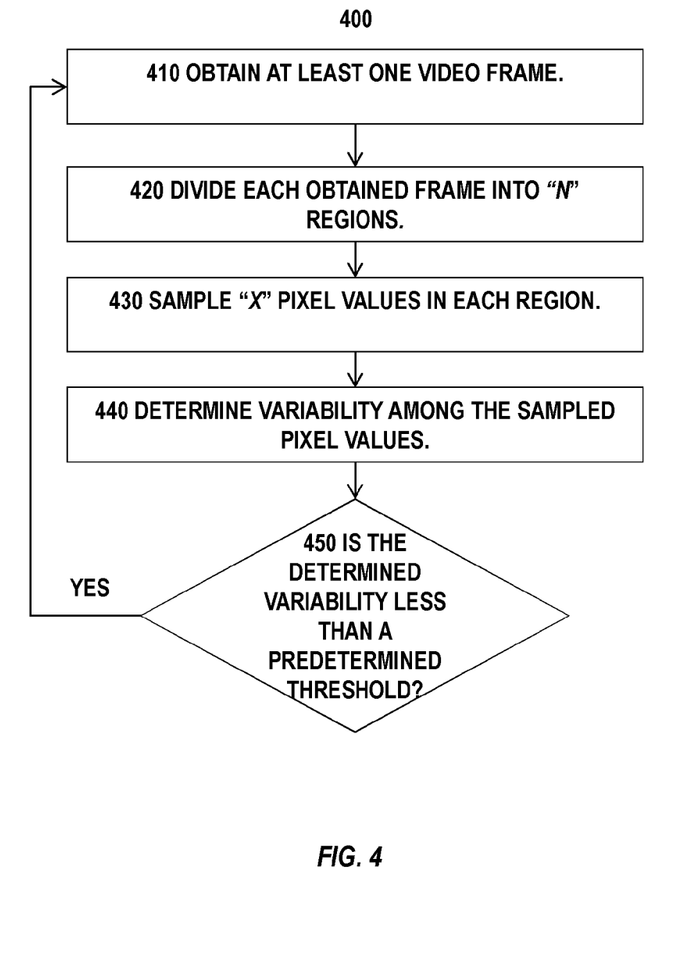
FIG. 4 illustrates methods of the technology for identifying at least one video frame more likely to be representative of the content of a video file.

Referring to FIG. 4, methods of the technology are illustrated. In some implementations of the present technology, at least one video frame is obtained 410. In some implementations, video frames can be obtained at random from the video, video frames can be chosen by the creator or some other user, video frames can be obtained at fixed intervals (e.g., every second) or at relative intervals (e.g., ¼, ½, and ¾ through the length of the video).

Each obtained frame can divided into a number of regions (N) 420. The regions can be of equal size and preferably cover a substantial portion of the frame. In a degenerate case, the frame can be "divided" into N=1 region.

Within each region (or the whole frame where the frame remains undivided) a number of samples (X) are taken of pixel value 430.

In some implementations, pixel value is indicated using the RGB model with values expressed as an RGB triplet. A color in the RGB color model is described by indicating how much of each of the red, green, and blue is included. The color is expressed as an RGB triplet (r, g, b), each component of which can vary from zero to a defined maximum value, e.g., 255. If all the components are at zero the result is black; if all are at maximum, the result is the brightest representable white.

The variability among sampled pixel values is determined 440. Where pixel values are express as RGB triplets, in some implementations the pixel values for each of R, G, and B are ordered, e.g., from lowest to highest, and a change count is incremented for each change between pixel values for that color in the list. For a list of Y values, a maximum of (Y−1) changes can be observed as variability among each color value for the sampled pixels. A minimum value can be applied to the changes between two pixel values, as a threshold to determine if it is to be considered a change. In the simplest case the threshold can be 1, meaning any change in pixel value is valid. In other cases, a value such as ten (10), twenty (20), or fifty (50) can be used.

The determined variability is compared to a predetermined threshold 450. If the determined variability is greater than or equal to a predetermined threshold, then the region is deemed "good;" if the determined variability is less than the predetermined threshold, then the region is deemed "bad." In some implementations of the RGB triplet example, if number of changes across color values is greater than or equal to a predetermined number ranging from 1 to 3*(Y−1), then the region is deemed "good." If the number of changes across color values is less than the predetermined number, then the region is deemed "bad."

If a predetermined number of regions are deemed "bad," then the video frame is rejected as not containing sufficient variability to serve as a frame from which a user is likely to be able to identify the video, and another frame is obtained 410, divided into regions 420, regions are sampled 430, variability is determined 440, and deemed "good" 450 or "bad" 460 as identified above, and the frame is deemed "good" or "bad" as identified above.

In some implementations, if the number of acceptable "good" regions is greater than or equal to the predetermined threshold, then another test is applied. In the other test, the median R, G, and B values for each "good" region is determined, and variability among the region medians is determined in the same fashion as with variability among sample points in a region as described above. For example, if out of the 8 regions 5 were "good" (and if the single region criteria is that at least one half the R, G, B data for sample points in a region must show a change when data for each color is separately ordered), then out of 8 total regions we must have at least 4 changes in the region median values. Since 3 were already bad that means there must be 4 changes in value in the remaining 5 values for this to be considered a valid frame.

Figure 5:
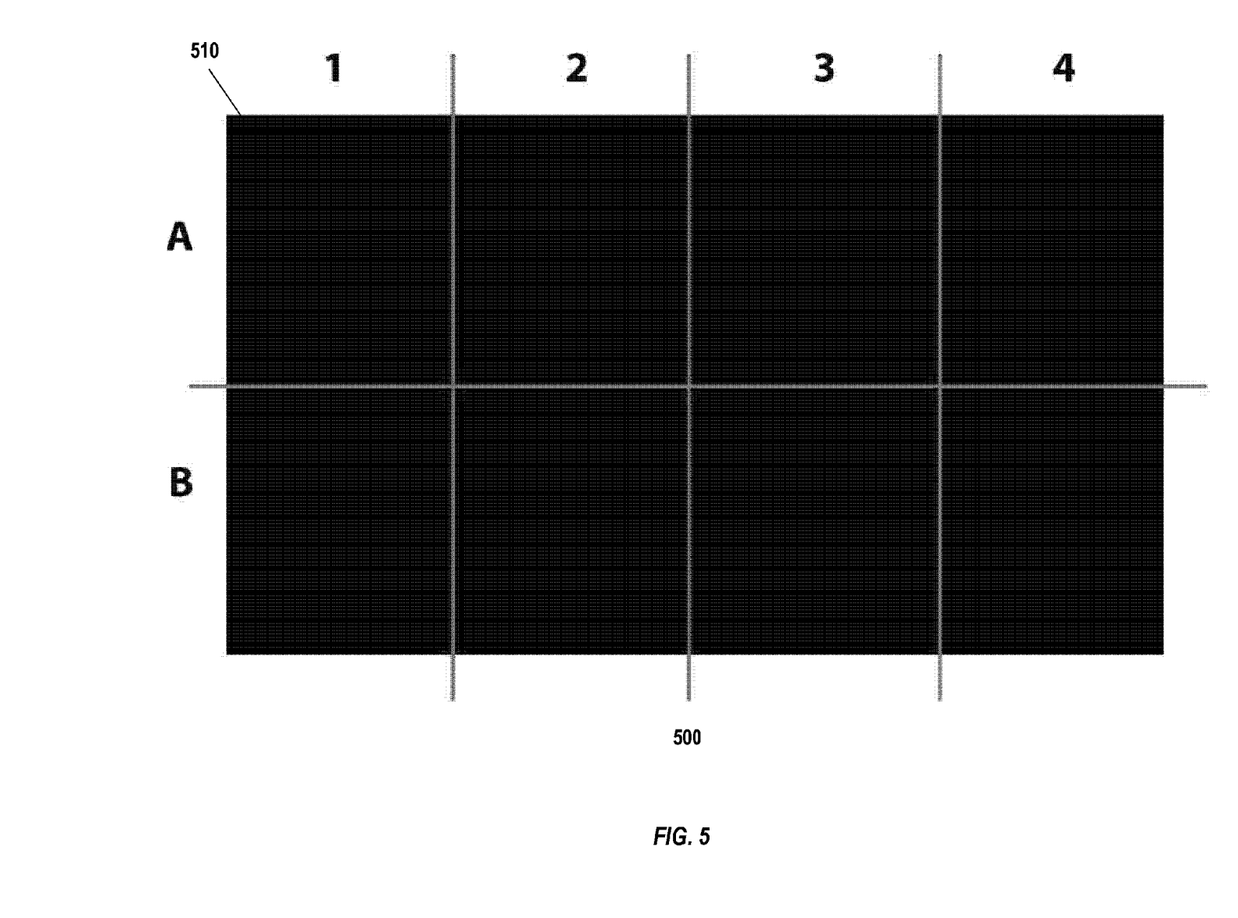
FIG. 5 illustrates a first frame divided into regions.
Figure 6:
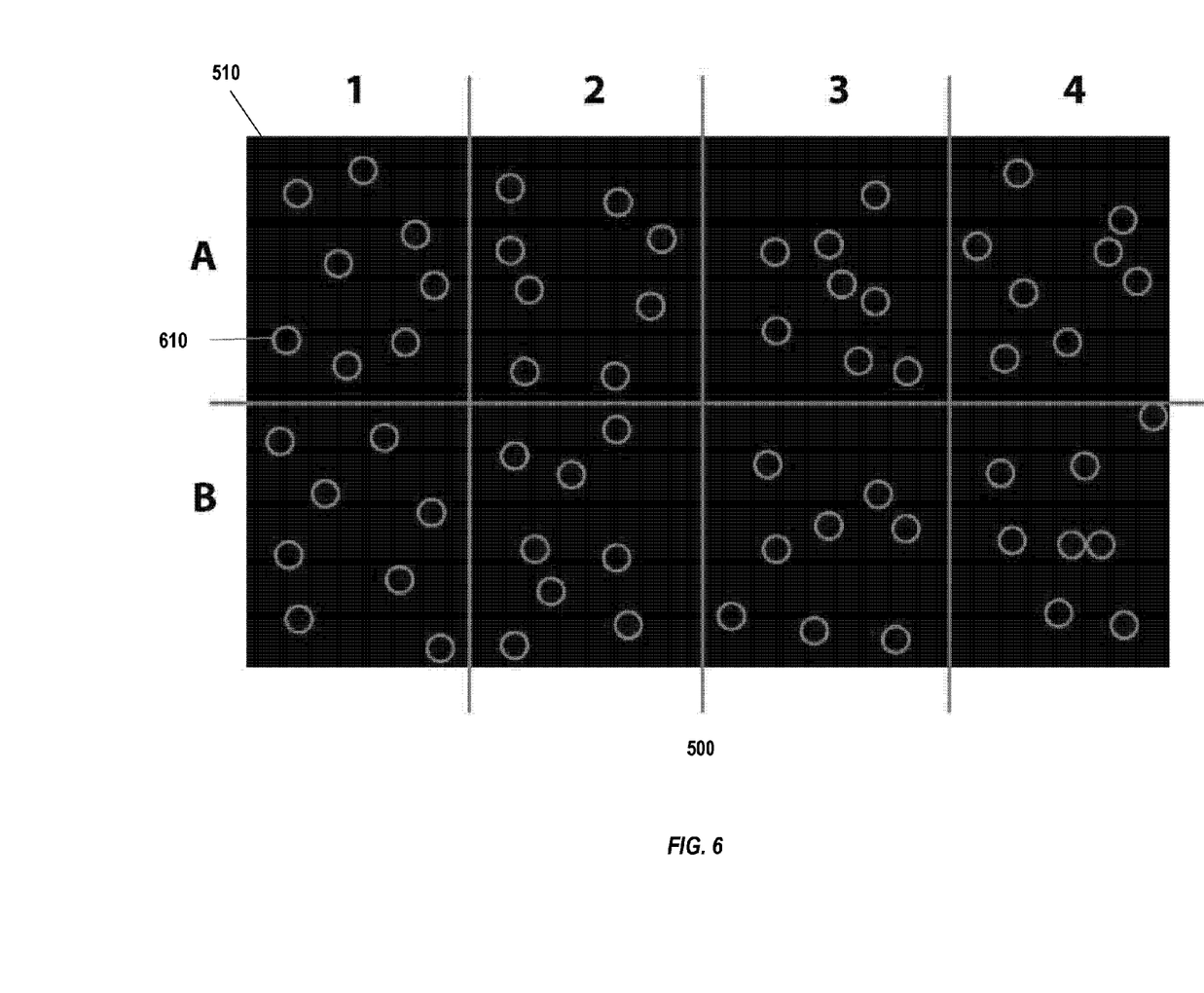
FIG. 6 illustrates the frame of FIG. 5 indicating sample pixels in each region.

Referring to FIG. 5-FIG. 8, an example of the technology is shown. In FIG. 5 and FIG. 6, a black frame 500, with low likelihood of allowing a user to identify the video from which the frame was grabbed, is shown. These particular implementations of the technology divide Black frame 500 into N=8 equally-sized segments, e.g., A1 510, covering the entire frame 500.

Figure 7:
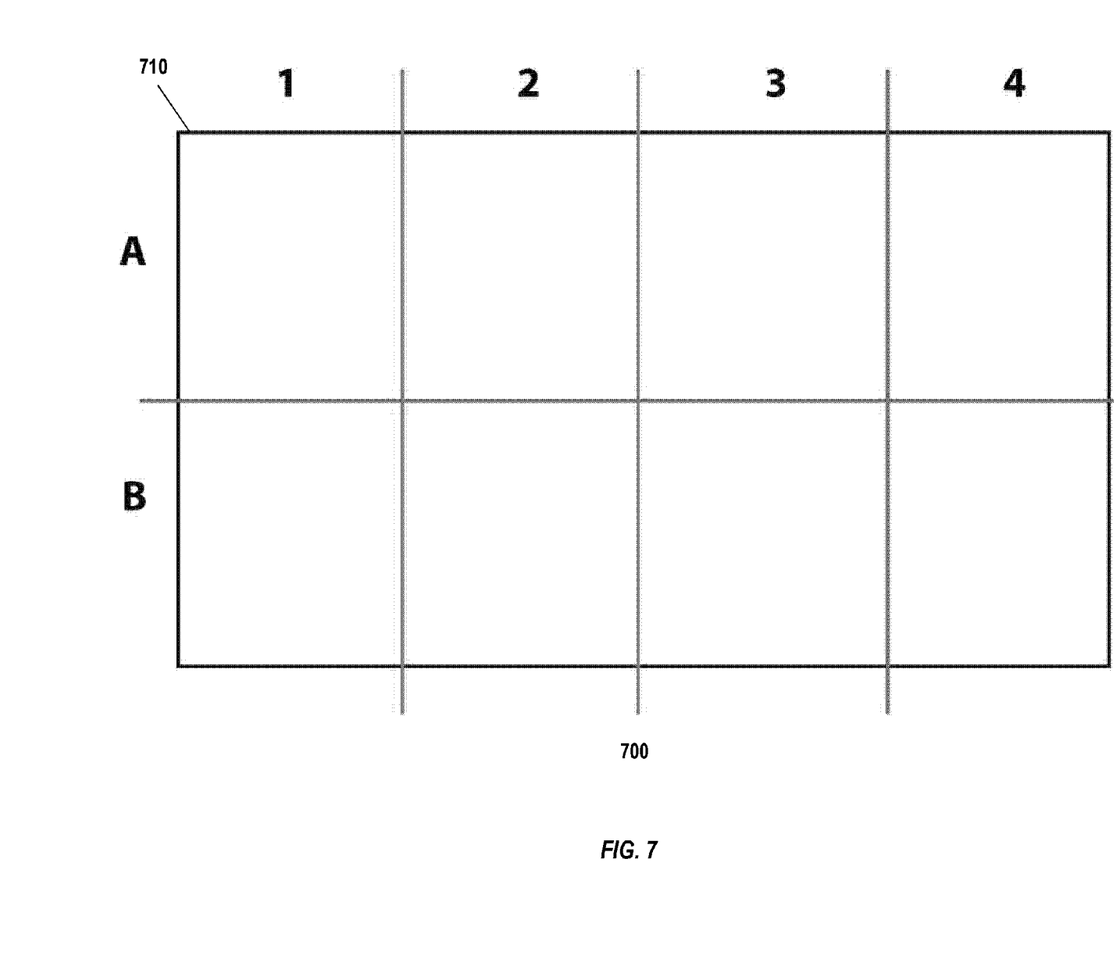
FIG. 7 illustrates a second frame divided into regions.

In FIG. 7, a multicolor frame 700, with higher likelihood of allowing a user to identify the video from which the frame was grabbed, is shown—though for simplicity of illustration the frame is shown as white in the figures. As with the black frame 500, these particular implementations of the technology divide the multicolor frame 700 into N=8 equally-sized segments, e.g., A1 710, covering the entire frame 700.

In FIG. 6, X=8 random pixels, e.g., 610 are sampled from each of eight regions {A1 710, A2, A3, A4, B1, B2, B3, B4} for RGB values. In the case of FIG. 6 region A1, each sampled RBG value is {0, 0, 0} corresponding to {<red>, <green>, <blue>} as shown in TABLE 3.

TABLE 3

| RBG and Change Count for FIG. 5. | | | |
|---|---|---|---|
| Point # | RED | GREEN | BLUE |
| 1 | 0 | 0 | 0 |
| 2 | 0 | 0 | 0 |
| 3 | 0 | 0 | 0 |
| 4 | 0 | 0 | 0 |
| 5 | 0 | 0 | 0 |
| 6 | 0 | 0 | 0 |
| 7 | 0 | 0 | 0 |
| 8 | 0 | 0 | 0 |

Variability among the samples pixel values can be determined by ordering the values for a single color among the points and determining the number of changes between adjacent values. In the case of FIG. 6, the ordered values for each of R, G, and B are identical, i.e., {0, 0, 0, 0, 0, 0, 0, 0}, and show no changes. This data set gives a variability of "0," i.e., the value for each color does not change from "0."

The maximum count of change that can be seen in this approach is twenty-one (21), i.e., three (3) colors times (X−1) (i.e., seven (7)) possible changes per color. In the example approach, if a region does not have at least one half the maximum amount of possible change, then the region is deemed unacceptable. In the example approach, if at least half the regions are unacceptable, then the frame is unacceptable and another frame is obtained.

In the case of the frame 510 of FIG. 5 and FIG. 6, no regions present change among sampled points above one half the maximum possible change, therefore the frame 510 of FIG. 5 and FIG. 6 is unacceptable. Consequently, a new frame, e.g., the frame 710 of FIG. 7 and FIG. 8, is obtained.

Figure 8:
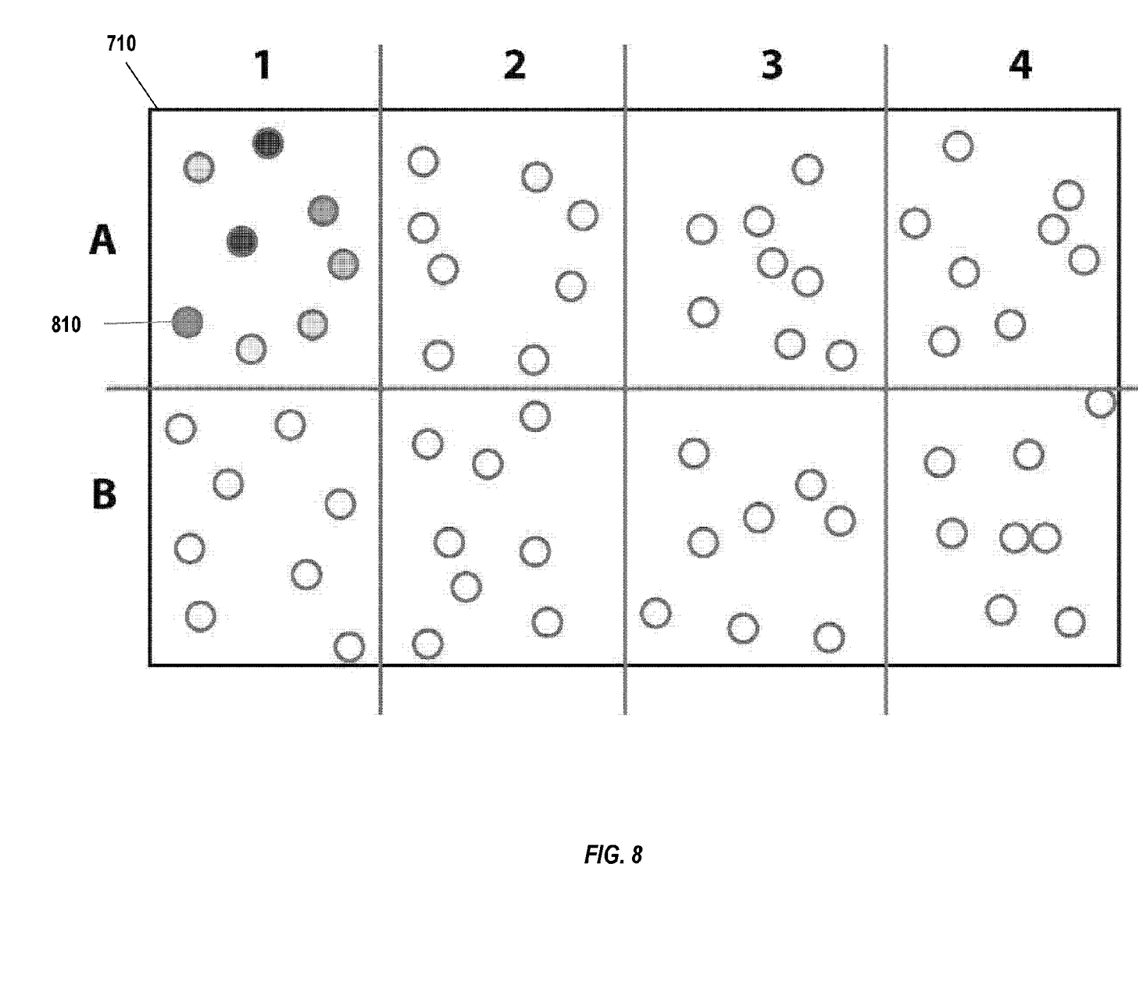
FIG. 8 illustrates the frame of FIG. 7 indicating sample pixels in each region.

Referring to FIG. 8, X=8 random pixels, e.g., 810 are sampled from each of eight regions {A1 710, A2, A3, A4, B1, B2, B3, B4} for RGB values. Each sampled RBG value corresponding to {<red>, <green>, <blue>} as shown in TABLE 4.

TABLE 4

Frame 710 Region A1 RBG Values.

| Point # | RED | GREEN | BLUE |
|---|---|---|---|
| 1 | 0 | 255 | 0 |
| 2 | 0 | 0 | 255 |
| 3 | 57 | 181 | 74 |
| 4 | 83 | 71 | 65 |
| 5 | 251 | 176 | 59 |
| 6 | 255 | 0 | 255 |
| 7 | 0 | 255 | 0 |
| 8 | 252 | 238 | 33 |

Ordered red values for these points are shown in TABLE 5 along with the corresponding change count of five (5).

TABLE 5

Ordered Frame 710 Region A1 Red Values and Change Count.

| Point # | RED | Change Count |
|---|---|---|
| 1 | 0 | |
| 2 | 0 | 0 |
| 7 | 0 | 0 |
| 3 | 57 | 1 |
| 4 | 83 | 2 |
| 5 | 251 | 3 |
| 8 | 238 | 4 |
| 6 | 255 | 5 |

Ordered green values for these points are shown in TABLE 6 along with the corresponding change count of five (5).

TABLE 6

Ordered Frame 710 Region A1 Green Values and Change Count.

| Point # | GREEN | Change Count |
|---|---|---|
| 2 | 0 | |
| 6 | 0 | 0 |
| 4 | 17 | 1 |
| 5 | 176 | 2 |
| 3 | 181 | 3 |
| 8 | 238 | 4 |
| 1 | 255 | 5 |
| 7 | 255 | 5 |

Ordered blue values for these points are shown in TABLE 7 along with the corresponding change count of five (5).

TABLE 7

Ordered Frame 710 Region A1 Blue Values and Change Count.

| Point # | BLUE | Change Count |
|---|---|---|
| 1 | 0 | |
| 7 | 0 | 0 |
| 8 | 33 | 1 |
| 5 | 59 | 2 |
| 4 | 65 | 3 |
| 3 | 74 | 4 |
| 2 | 255 | 5 |
| 6 | 255 | 5 |

The total change count for frame 710 region A1 is fifteen (15), well over one half the maximum change count of twenty one (21) for eight (8) sampled points in the region. Assuming at least one half (½) the regions of frame 710 present total change counts greater than one half the maximum count, frame 710 is deemed an acceptable frame.

In some implementations, a plurality of "good" frames is identified and a frame with the highest level of variability is selected to serve as the basis for a thumbnail to represent the video.

The present technology can take the forms of hardware, software or both hardware and software elements. In some implementations, the technology is implemented in software, which includes but is not limited to firmware, resident software, microcode, a Field Programmable Gate Array (FPGA), graphics processing unit (GPU), or Application-Specific Integrated Circuit (ASIC), etc. In particular, for real-time or near real-time use, an FPGA or GPU implementation would be desirable.

Furthermore, portions of the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be non-transitory (e.g., an electronic, magnetic, optical, electromagnetic, infrared, or semiconductor system (or apparatus or device)) or transitory (e.g., a propagation medium). Examples of a non-transitory computer-readable medium include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized or distributed (or a combination thereof) as known to those skilled in the art.

Figure 9:
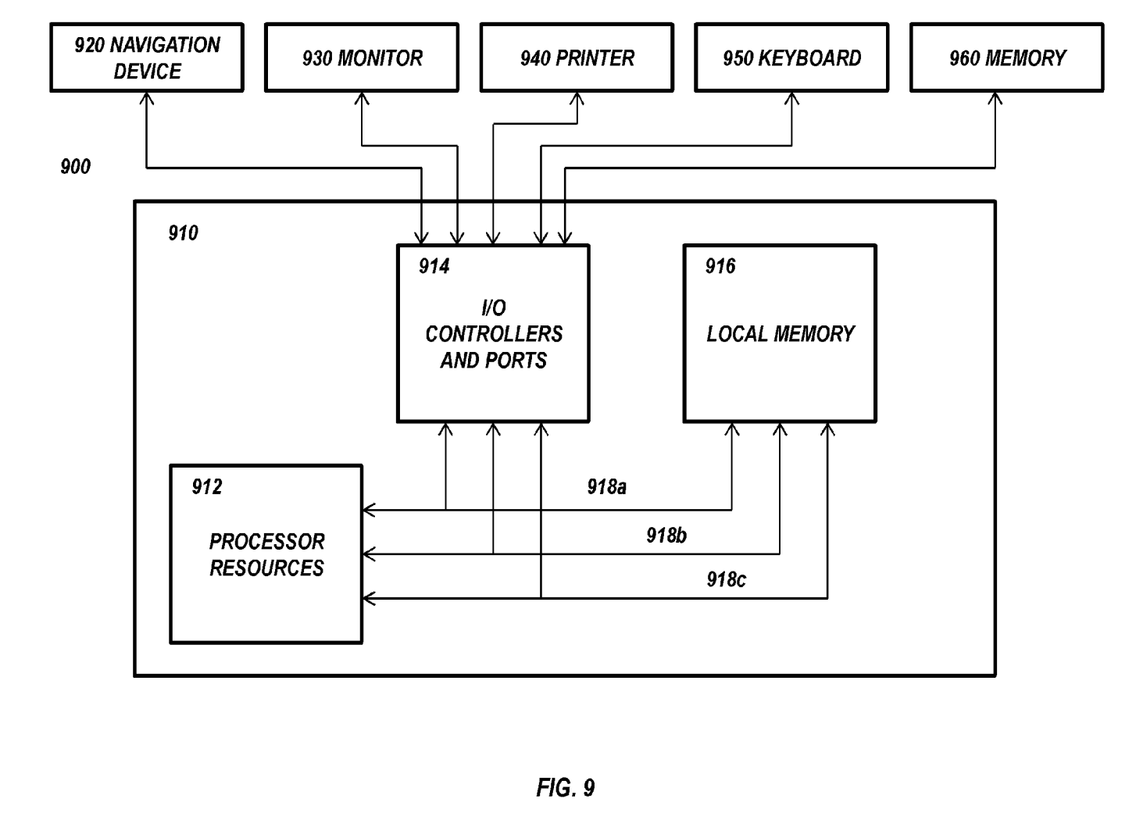
FIG. 9 illustrates a data processing system suitable for storing a computer program product of the present technology

Referring to FIG. 9, a data processing system (e.g., 900) suitable for storing a computer program product of the present technology and for executing the program code of the computer program product can include at least one processor (e.g., processor resources 912) coupled directly or indirectly to memory elements through a system bus (e.g., 918 comprising data bus 918a, address bus 918b, and control bus 918c). The memory elements can include local memory (e.g., 916) employed during actual execution of the program code, bulk storage (e.g., 960), and cache memories (e.g., including cache memory as part of local memory or integrated into processor resources) that provide temporary storage of at least some program code in order to reduce the number of times code must be retrieved from bulk storage during execution. Input/output or I/O devices (including but not limited to keyboards 950, displays 930, pointing devices 920, etc.) can be coupled to the system either directly or through intervening I/O controllers (e.g., 914). Network adapters can also be coupled to the system to enable the data processing system to become coupled to other data processing systems or remote printers or storage devices through intervening private or public networks. Modems, cable modem and Ethernet cards are just a few of the currently available types of network adapters. Such systems can be centralized or distributed, e.g., in peer-to-peer and client/server configurations. In some implementations, the data processing system is implemented using one or both of FPGAs and ASICs.

What is claimed is:

1. A computer implemented method for representing a video by a frame of the video, the method comprising:
   processing a frame, the processing comprising:
      obtaining a first frame of a video;
      dividing the obtained frame into a plurality of regions; and
      for each region,
         obtaining a pixel value from each of a plurality of pixels of the region;
         determining a first variability among the obtained pixel values of the region;
         for a determined first variability greater than or equal to a first predetermined threshold, identifying the region as "good;" and
      upon identifying a number of good regions greater than or equal to a second predetermined threshold, representing the video by the obtained frame;
      upon identifying a number of good regions less than the second predetermined threshold, processing at least one subsequent frame;
      wherein the pixel value is an RGB pixel value and the first variability is a function of the obtained RGB pixel value; and
      wherein the first variability is determined by:
         separately ordering the pixel values for each R, G and B color to form an ordered list of pixel values for each R, G and B color,
         counting a number of changes between adjacent pixel values in the ordered list of pixel values for each R, G and B color, and
         summing the number of changes between adjacent pixel values in the ordered list of pixel values for each R, G and B color to determine the cumulative number of changes across all R, G and B color values.

2. The computer implemented method of claim 1, wherein: each region is the same size.

3. The computer implemented method of claim 1:
   wherein processing at least one subsequent frame comprises processing a plurality of subsequent frames, and
   further comprising representing the video with a frame having the greatest variability from among processed frames.

4. The computer implemented method of claim 1, wherein: obtaining a frame comprises one of:
   obtaining a frame at random from the video;
   obtaining a plurality of frames at intervals from the video.

5. A computer program product for representing a video by a frame of the video, the computer program product comprising:
   a non-transitory computer readable medium, and
   a computer program module,
      stored on the medium, and
      comprising instructions that, when executed by processor resources, are operable to:
      process a frame, the process comprising:
         obtaining a first frame of a video;
         dividing the obtained frame into a plurality of regions; and
         for each region,
            obtaining a pixel value from each of a plurality of pixels of the region;
            determining a first variability among the obtained pixel values of the region;
            for a determined first variability greater than or equal to a first predetermined threshold, identifying the region as "good;" and
         upon identifying a number of good regions greater than or equal to a second predetermined threshold, representing the video by the obtained frame;
         upon identifying a number of good regions less than the second predetermined threshold, processing at least one subsequent frame;
         wherein the pixel value is an RGB pixel value and the first variability is a function of the obtained RGB pixel value; and
         wherein the first variability is determined by:
            separately ordering the pixel values for each R, G and B color to form an ordered list of pixel values for each R, G and B color,
            counting a number of changes between adjacent pixel values in the ordered list of pixel values for each R, G and B color, and
            summing the number of changes between adjacent pixel values in the ordered list of pixel values for each R, G and B color to determine the cumulative number of changes across all R, G and B color values.

6. The computer program product of claim 5, wherein: each region is the same size.

7. The computer program product of claim 5:
   wherein processing at least one subsequent frame comprises processing a plurality of subsequent frames, and
   further comprising representing the video with a frame having the greatest variability from among processed frames.

8. The computer program product of claim 5, wherein: obtaining a frame comprises one of:
   obtaining a frame at random from the video;
   obtaining a plurality of frames at intervals from the video.

9. A system for representing a video by a frame of a video, the system comprising:
   processor resources,
   a non-transitory computer readable medium, in communication with the processor resources, and
   a computer program module, stored on the medium, and comprising instructions that, when executed by the processor resources, are operable to:
   process a frame, the process comprising:
      obtaining a first frame of a video;
      dividing the obtained frame into a plurality of regions; and
      for each region,
         obtaining a pixel value from each of a plurality of pixels of the region;
         determining a first variability among the obtained pixel values of the region;
         for a determined first variability greater than or equal to a first predetermined threshold, identifying the region as "good;" and
      upon identifying a number of good regions greater than or equal to a second predetermined threshold, representing the video by the obtained frame;
      upon identifying a number of good regions less than the second predetermined threshold, processing at least one subsequent frame;
      wherein the pixel value is an RGB pixel value and the first variability is a function of the obtained RGB pixel value; and wherein the first variability is determined by:
separately ordering the pixel values for each R, G and B color to form an ordered list of pixel values for each R, G and B color,
counting a number of changes between adjacent pixel values in the ordered list of pixel values for each R, G and B color, and
summing the number of changes between adjacent pixel values in the ordered list of pixel values for each R, G and B color to determine the cumulative number of changes across all R, G and B color values.

10. The system of claim 9 wherein:
for a determined variability greater than or equal to the predetermined threshold, representing the video by the first frame.

11. The system of claim 9
wherein processing at least one subsequent frame comprises processing a plurality of subsequent frames, and
further comprising representing the video with a frame having the greatest variability from among processed frames.

12. The system of claim 9, wherein:
obtaining a frame comprises one of:
obtaining a frame at random from the video;
obtaining a plurality of frames at intervals from the video.

* * * * *